United States Patent Office 3,708,493
Patented Jan. 2, 1973

3,708,493
p-(ACETOACETAMIDOALKYL) BENZENESULFON-AMIDE DERIVATIVES
Henri Dietrich, Arlesheim, Basel-Land, and Claude Lehmann, Basel, Switzerland, assignors to Ciba-Geigy Corporation
No Drawing. Filed Sept. 1, 1970, Ser. No. 68,797
Claims priority, application Switzerland, Sept. 4, 1969, 13,396/69
Int. Cl. C07d 49/30
U.S. Cl. 260—309.7     3 Claims

ABSTRACT OF THE DISCLOSURE

Compounds of the class of 1-[p-(acetoacetamidoalkyl)-phenylsulfonyl]-2-imino-imidazolidines and the pharmaceutically acceptable acid addition salts thereof, have hypoglycemic activity; the compounds are active ingredients of pharmaceutical compositions and can be used for the treatment of diabetes mellitus; a typical embodiment is 1-[p-(2-acetoacetamidoethyl) - phenylsulfonyl]-2-imino-3-methylimidazolidine.

---

The present invention relates to derivatives of p-(acetoacetamidoalkyl)-benzenesulfonamides, to pharmaceutical compositions containing these compounds and to the use thereof.

More particularly, the present invention relates to compounds of formula

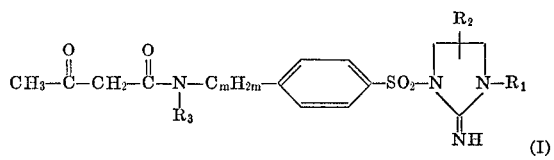

(I)

wherein $R_1$ is alkyl having from one to six carbon atoms, allyl, phenylalkyl having at most nine carbon atoms, cycloalkyl or cycloalkenyl each having from five to eight carbon atoms;
$R_2$ is hydrogen, methyl or ethyl;
$R_3$ is hydrogen or methyl; and
$m$ is the integer 2 or 3;

and the pharmaceutically acceptable acid addition salts thereof.

These compounds have been found to have a hypoglycemic effect in warm-blooded animals upon oral or parenteral administration. This activity in combination with a favorable therapeutic index characterize the compounds of the present invention as being suitable for the treatment of diabetes mellitus.

The hypoglycemic action can be demonstrated in standard tests on experimental animals.

In the compounds of Formula I, the substituent $R_1$ can be as alkyl, e.g. the methyl, ethyl, propyl, isopropyl, butyl, sec.butyl, tert.butyl, isobutyl, pentyl, isopentyl, 2,2-dimethylpropyl, 1-methylbutyl, 1-ethylpropyl, 1,2-dimethylpropyl, n-hexyl, methylpentyl, dimethylbutyl, or the ethylbutyl group; as cycloalkyl, $R_1$ can be the cyclopentyl group which can be optionally substituted by alkyl radicals having 1-3 carbon atoms, the cyclohexyl group which can be substituted by ethyl or methyl, and the cycloheptyl group optionally substituted by methyl, as well as the cyclooctyl group; as the cycloalkenyl group, $R_1$ can be the cyclopenten-1-yl, the 2-cyclohexen-1-yl, the 3-cyclohexen-1-yl, the 2-methyl-2-cyclohexen-1-yl, the 3-cyclohepten-1-yl group, or a cyclooctenyl group; as the phenylalkyl group, $R_1$ can be the benzyl group, the phenylethyl group or the α-methylphenylethyl group.

Using the process according to the invention, compounds of Formula I are produced by reacting a compound of formula

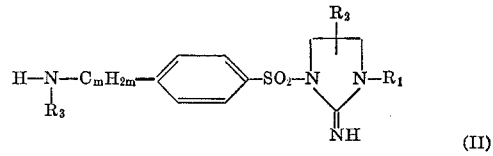

(II)

wherein $R_1$, $R_2$, $m$ and $R_3$ have the meaning given under Formula I, with diketene; and, optionally, converting the obtained reaction products into the salt of an inorganic or organic acid.

The reaction is performed, e.g. at temperatures of $-20°$ C. to $+30°$ C., preferably at $-10°$ to $0°$, in an inert organic solvent. Suitable solvents are, e.g.: hydrocarbons such as benzene, toluene or xylene, ethers such as diethyl ether, dioxane or tetrahydrofuran, chlorinated hydrocarbons such as methylene chloride, and lower ketones such as acetone or methyl ethyl ketone.

The starting compounds of Formula II are, for their part, new compounds, and can be produced e.g. by reacting a reactive derivative of a sulfonic acid of formula

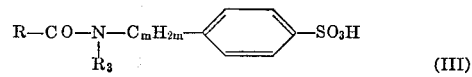

(III)

wherein

R represents a simple alkyl radical or aryl radical, e.g., a methyl group or a phenyl group, and
$R_3$ and $m$ have the meaning given in Formula I, with 2-amino-2-imidazoline derivatives of formula

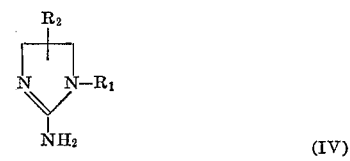

(IV)

wherein $R_1$ and $R_2$ have the meaning given under Formula I; and subsequently hydrolytically splitting off the protective acyl group (R—CO—). The N-acyl compounds derived from Formula II, obtained as intermediate products, have likewise not been described hitherto in the literature.

Suitable reactive derivatives of a sulfonic acid of Formula III are halides, especially chlorides and anhydrides of formula

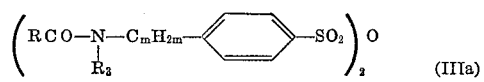

(IIIa)

wherein $R_3$ and $m$ have the meaning given under Formula I.

The anhydrides of Formula IIIa can be obtained in a simple manner by the reaction of corresponding substituted sulfonic acid halides with salts of correspondingly substituted sulfonic acids.

Using a further process, starting materials of Formula II are obtained by reacting substituted p-(aminoalkyl)-benzenesulfonamides (produced analogously to the method of E. Miller, J. Amer. Chem. Soc. 62, 2101 (1940)) of formula

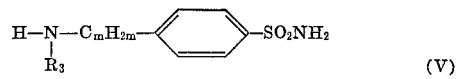

(V)

wherein $m$ and $R_3$ have the meaning given under Formula

I, with substituted N-(2-boroalkyl)-cyanoamides in an alkaline medium.

The new active substances of Formula I, or the pharmaceutically acceptable salts thereof, can be administered orally, rectally or parenterally. For salt formation, it is possible to use physiologically harmless inorganic or organic acids such as, e.g. hydrochloric acid, hydrobromic acid, sulfuric acid, phosphoric acid, methanesulfonic acid, acetic acid, lactic acid, succinic acid, tartaric acid and maleic acid; but also hypoglycemically active sulfonyl ureas such as, e.g. p-toluenesulfonylbutyl urea, p-chlorobenzenesulfonylpropyl urea, and p-[2-(2-methoxy-5-chlorobenzamido)-ethyl] - phenylsulfonyl - cyclohexyl urea.

For their intended use, the compounds of the invention are administered in amounts depending on the species, the age, weight and particular condition of the individual being treated and the mode of administration. In general, the daily oral dosage varies between about 0.1 and 100 mg./kg. of body weight for warm-blooded animals Suitable dosage units such as dragées or tablets preferably contain 10–200 mg. of an active substance according to the invention, whereby the content of active substance is 20–80% by weight. Tablets and dragées are produced by combining the active substance, e.g. with solid pulverulent carries such as lactose, saccharose, sorbitol or mannitol; starches such as potato starch, maize starch or amylopectin, also laminaria powder or citrus pulp powder, cellulose derivatives or gelatine, optionally with the addition of lubricants such as magnesium or calcium stearate or polyethylene glycols of suitable molecular weights. The tablets and dragée cores are coated, e.g. with concentrated sugar solutions which may also contain, e.g. gum arabic, talcum and/or titanium dioxide, or with a lacquer dissolved in readily volatile organic solvents or mixtures of solvents. Dyestuffs may be added to these coatings, e.g. for identification of the varying dosage amounts.

Other suitable dosage units for oral administration are hard gelatine capsules, as well as soft closed capsules made from gelatine and a softener such as glycerin. The hard capsules contain the active substance preferably as a granulate, e.g. in admixture with fillers such as maize starch, and/or lubricants such as talcum or magnesium stearate, and, optionally, stabilisers such as sodium metabisulphite ($Na_2S_2O_5$) or ascorbic acid. In soft capsules, the active substance is preferably dissolved or suspended in suitable liquids such as liquid polyethylene glycols, whereby likewise stabilisers may be added.

The following prescriptions further illustrate the production of tablets and dragées:

(a) 1000 g. 1-[p-(2-acetoacetamidoethyl)-phenyl-sulphonyl]-2-imino-3 - cyclohex-3-enyl imidazolidine are mixed with 500 g. of lactose and 270 g. of potato starch; the mixture is then moistened with an aqueous solution of 8.0 g. of gelatine, and granulated through a sieve. After drying of the granulate, 60.0 g. of potato starch, 60.0 g. of talcum, 10.0 g. of magnesium stearate and 20.0 of colloidal silicon dioxide are mixed in; and the mixture is then pressed into 10,000 tablets each weighing 200 mg. and each containing 100 mg. of active substance. Optionally, the tablets may be provided with grooves to facilitate a more precise adjustment of the dosage amount.

(b) A granulate is produced from 100 g. of 1-[p-(2-acetoacetamidoethyl)-phenylsulfonyl] - 2 - imino-3-cyclohexyl imidazolidine, 345.0 g. of lactose and the aqueous solution of 6.0 g. of gelatine. After drying, the granulate is mixed with 10.0 g. of colloidal silicon dioxide, 40.0 g. of talcum, 40.0 g. of potato starch and 5.0 g. of magnesium stearate; the mixture is then pressed into 10,000 dragée cores. These are subsequently coated with a concentrated syrup made from 533.0 g. of crystallised saccharose, 20.0 g. of shellac, 75.0 of gum arabic, 250 g. of talcum, 20 g. of colloidal silicon dioxide and 1.5 g. of dyestuff; and then dried. The obtained dragées each weight 240 mg. and each contain 100 mg. of active substance.

The following example further illustrates the production of the new compounds of Formula I and of intermediate products not described hitherto; but these examples in no way constitute the only embodiments thereof. The temperatures are given in degrees centigrade.

EXAMPLE 1

(I)

An amount of 35.8 g. of 1-[p-(2-aminoethyl)-phenylsulfonyl] - 2 - imino - 3 - methyl imidazolidine dihydrochloride is dissolved in 200 ml. of water; to this solution are then added 500 ml. of 2-n sodium hydroxide solution; the free base is extracted with methylene chloride, and the extract dried with sodium sulfate. To the thus obtained solution (cooled to −10°) of 1-[p-(2-aminoethyl)-phenylsulfonyl] - 2 - imino - 3 - methyl imidazolidine is added dropwise, with stirring, a solution of 8.5 g. of diketene in 15 ml. of methylene chloride. The reaction mixture is further stirred for 1 hour at −10° to 0°, and subsequently concentrated in vacuo to dryness in a rotary evaporator with a water-bath temperature of 40°. The residue is recrystallised from ethyl acetate. The pure 1-[p-(2-acetoacetamidoethyl)phenylsulfonyl] - 2 - imino-3-methyl imidazolidine melts at 120–121°.

The following are obtained analogously by the reaction, in each case, of 8.5 g. of diketene:

(a) from 38.1 g. of 1-[p-(2 - aminoethyl)-phenylsulfonyl] - 2 - imino - 3 - allyl imidazolidine dihydrochloride, M.P. 232–233°, is obtained: 1-[p-(2-acetoacetamidoethyl)-phenylsulfonyl] - 2 - imino - 3 - allyl imidazolidine, M.P. 91–91.5°;

(b) from 39.7 g. of 1-[p-(2 - aminoethyl)-phenylsulfonyl] - 2 - imino - 3 - butyl imidazolidine dihydrochloride, M.P. 259–260°, is obtained: 1-[p-(2-acetoacetamidoethyl)-phenylsulfonyl] - 2 - imino - 3 - butyl imidazolidine, M.P. 138–139°;

(c) from 42.5 g. of 1-[p-(2 - aminoethyl)-phenylsulfonyl] - 2 - imino-3-(3-methylpent-2-yl)-imidazolidine dihydrochloride (solidified in vitreous form) is obtained: 1 - [p - (2 - acetoacetamidoethyl) - phenylsulfonyl) - 2 - imino - 3 - (3 - methylpent - 2 - yl)-imidazolidine, as oil;

(d) from 40.9 g. of 1 - [p - (2 - aminoethyl)-phenylsulfonyl] - 2 - imino - 3 - cyclopentyl imidazolidine dihydrochloride, decomposition point 270°, is obtained: 1 - [p - (2 - acetoacetamidoethyl)-phenylsulfonyl] - 2-imino - 3 - cyclopentyl imidazolide, M.P. 118–119°;

(e) from 42.1 g. of 1-[p-(2-aminoethyl)phenylsulfonyl]-2 - imino - 3 - (cyclohex - 3 - enyl)-imidazolidine dihydrochloride, M.P. 245–247°, is obtained: 1-[p-(2-acetoacetamidoethyl)phenylsulfonyl] - 2 - imino - 3 - (cyclohex - 3 - enyl)-imidazolidine, M.P. 102–103°;

(f) from 42.3 g. of 1-[p-(2-aminoethyl)-phenylsulfonyl]-2 - imino - 3 - cyclohexyl imidazolidine dihydrochloride, M.P. 247–250°, is obtained: 1-[p-(2-acetoacetamidoethyl) - phenylsulfonyl] - 2 - imino - 3 - cyclohexyl imidazolidine, M.P. 107–108°;

(g) from 43.7 g. of 1-[p-(2-aminoethyl)-phenylsulfonyl]-2 - imino - 3 - (4 - methylcyclohexyl)-imidazolidine dihydrochloride, decomposition point 260°, is obtained: 1 - [p - (2 - acetoacetamidoethyl)-phenylsulfonyl]-2-imino - 3 - (4 - methylcyclohexyl)-imidazolidine, M.P. 119–120°;

(h) from 43.7 g. of 1-[p-(2-aminoethyl)-phenylsulfonyl]-2 - imino - 3 - cycloheptyl imidazolide dihydrochloride, decomposition point 280°, is obtained: 1-[p-(2-acetoacetamidoethyl)phenylsulfonyl] - 2 - amino - 3 - cycloheptyl imidazolidine, M.P. 102°;

(i) from 44.5 g. of 1-[p-aminoethyl)-phenylsulfonyl]-2-imino - 3 - (2 - phenylethyl)-imidazolidine dihydrochloride is obtained: 1 - [p - (2 - acetoacetamidoethyl)-phenylsulfonyl] - 2 - imino - 3 - (2 - phenylethyl)-imidazolidine, M.P. 113–117°;

(II)

(j) from 43.1 g. of 1-[p-(2 - aminoethyl)-phenylsulfonyl] - 2 - imino - 3 - benzyl-imidazolidine dihydrochloride is obtained: 1-[p-(2 - acetoacetamidoethyl)-phenylsulfonyl] - 2 - imino - 3 - benzyl-imidazolidine, M.P. 136.5–138°;

(k) from 43.7 g. of 1-[p-(2 - aminoethyl)-phenylsulfonyl] - 2 - imino-3-3-cyclohexyl - 4 - methyl-imidazolidine dihydrochloride is obtained: 1-[p-(2 - acetoacetamidoethyl)-phenylsulfonyl] - 2 - imino - 3 - cyclohexyl-4-methyl-imidazolidine, M.P. 130–133°.

(l) from 42.5 g. of 1-[p-(2 - aminoethyl)-phenylsulfonyl] - 2 - imino - 3 - butyl - 4 - ethyl-imidazolidine dihydrochloride is obtained: 1-[p-(2 - acetoacetamidoethyl)-phenylsulfonyl] - 2 - imino - 3 - butyl-4-ethyl-imidazolidine, M.P. 93–94°;

(m) from 43.7 g. of 1-[p-(2 - aminoethyl)-phenylsulfonyl] - 2 - imino - 3 - cyclopentyl - 4 - ethyl-imidazolidine dihydrochloride is obtained: 1-[p-(2 - acetoacetamidoethyl)-phenylsulfonyl] - 2 - imino - 3 - cyclopentyl-4-ethyl-imidazolidine, M.P. 80–82°;

(n) from 41.1 g. of 1-[p-(2 - aminoethyl)-phenylsulfonyl] - 2 - imino - 3 - butyl - 4 - methyl-imidazolidine dihydrochloride is obtained: 1-[p-(2 - acetoacetamidoethyl)-phenylsulfonyl] - 2 - imino - 3 - butyl-4-methyl-imidazolidine, M.P. 104.5–105.5°;

(o) from 45.4 g. of 1-[p-(2-(N-methyl-amino)-propyl)-phenylsulfonyl] - 2 - imino-3-cyclohexyl-imidazolidine dihydrochloride is obtained: 1-[p-(2-(N-methyl-acetoacetamido)-propyl)-phenylsulfonyl] - 2 - imino-3-cyclohexyl-imidazolidine, M.P. 104–107°;

(p) from 43.7 g. of 1-[p-(2 - amino-propyl)-phenylsulfonyl] - 2 - imino - 3 - cyclohexyl-imidazolidine dihydrochloride is obtained: 1-[p-(2 - acetoacetamido-propyl)-phenylsulfonyl] - 2 - imino - 3 - cyclohexyl-imidazolidine, M.P. 91–92°.

(III)

The dihydrochlorides (used as starting materials) of 1-[p-(2-aminoethyl) - phenylsulfonyl] - 2 - imino-imidazolidines varyingly substituted in the 3-position can be obtained, e.g. in a simple manner by the reaction of p-acylamidoethyl-benzenesulfochloride with correspondingly substituted 2-amino-imidazolines of Formula IV, and subsequent hydrolytic splitting off of the acyl radical of the p-acylamidoethyl group with aqueous hydrochloric acid, as is described in the following for 1-[p-(2-aminoethyl) - phenylsulfonyl]-2-imino-3-cyclohexyl imidazolidine dihydrochloride.

(α) To a solution of 17 g. of sodium hydroxide in 170 ml. of water are added 40.8 g. of 1-cyclohexyl-2-amino-imidazoline hydrochloride. The obtained clear solution is mixed with a solution of 52.4 g. of p-(2-acetamidoethyl)-benzenesulfochloride in 200 ml. of acetone, whereby heating occurs. The mixture is heated for half an hour to 90°, and then concentrated in vacuo to dryness. The thus obtained crude 1-[p-(2-acetamidoethyl) phenylsulfonyl]-2-imino-3-cyclohexyl imidazolidine melts at 181–183° after recrystallisation from ethyl acetate.

The applied sulfochloride can be prepared as follows: To 35.0 g. of chlorosulfonic acid are added in portions, whilst stirring is maintained, 16.3 g. of N-phenylethylacetamide. The obtained mixture is stirred for 3 hours at 60°, and then poured on to ice, whereby p-(2-acetamidoethyl)-benzenesulfochloride precipitates in crystalline form. It is filtered off under suction, washed with water, dried in vacuo, and then further processed as crude product.

(β) A solution of 39.2 g. of 1-[p-(2-acetamidoethyl)-phenylsulfonyl]-2-imino - 3-cyclohexylimidazolidine (prepared according to the above prescription) in 370 ml. of 2-n hydrochloric acid is refluxed for 6 hours; it is then concentrated in vacuo to dryness. The crude oily 1-[p-(2-aminoethyl) - phenylsulfonyl] - 2-imino-3-cyclohexyl imidazolidine dihydrochloride is taken up in warm ethanol. It crystallises out in the cold state from the ethanolic solution, and melts at 247–250°.

What is claimed is:

1. A compound of formula $$CH_3-\overset{O}{\overset{\|}{C}}-CH_2-\overset{O}{\overset{\|}{C}}-\underset{R_3}{\overset{}{N}}-C_mH_{2m}-\langle\phantom{X}\rangle-SO_2-\underset{\underset{NH}{\|}}{N}\overset{R_2}{\underset{}{\phantom{X}}}N-R_1$$ (I)

wherein
R₁ is alkyl of from one to six carbon atoms, allyl, phenylalkyl of at most three carbon atoms in the alkyl chain, cycloalkyl, cycloalkenyl, alkyl substituted cycloalkyl or alkyl substituted cycloalkenyl of from five to eight carbon atoms;
R₂ is hydrogen, methyl or ethyl;
R₃ is hydrogen or methyl; and
m is the integer 2 or 3;
or the pharmaceutically acceptable acid addition salts thereof.

2. A compound according to claim 1, which is 1-[p-(2 - acetoacetamidoethyl) - phenylsulfonyl] - 2 - imino-3-methyl-imidazolidine.

3. A compound according to claim 1, which is 1-[p-(2 - acetoacetamidoethyl) - phenylsulfonyl] - 2 - imino-3-cyclohexyl imidazolidine.

References Cited
UNITED STATES PATENTS 3,538,085  11/1970  Dietrich _____ 260—309.7

OTHER REFERENCES

Bukac et al.: Chem. Abst., vol. 68, No. 69414j (1968).
Dietrich et al.: Chem. Abst., vol. 72, No. 12725q (1970).

NATALIE TROUSOF, Primary Examiner

U.S. Cl. X.R.

260—543 R, 545 R, 556 A R; 424—273